United States Patent Office 3,594,284
Patented July 20, 1971

3,594,284
LYSOSTAPHIN FERMENTATION WITH ACCELERATED TIME CYCLE
Walter Anthony Zygmunt and Henry Polk Browder, Evansville, Ind., assignors to Mead Johnson & Company, Evansville, Ind.
No Drawing. Filed June 4, 1968, Ser. No. 734,201
Int. Cl. C12d 9/00
U.S. Cl. 195—96                                     6 Claims

ABSTRACT OF THE DISCLOSURE

Reduced fermentation periods are obtained in the lysostaphin fermentation when heat sterilization of the medium is eliminated and an inoculum volume of from 2.5% to 20% is employed. A cyclic process in which an aliquot of one batch serves as inoculum for the next is described.

---

The present invention is an improved fermentation process for the production of the antibiotic lysostaphin. Lysostaphin is an antibiotic having an enzymic nature which is specific for bacteria of the genus Staphylococcus. It is the subject of U.S. 3,278,378, patented Oct. 11, 1966, by C. A. Schindler and V. T. Schuhardt. An improved method for its production by fermentation is the subject of U.S. patent application Ser. No. 381,684, filed July 10, 1964, by Zygmunt and Browder, now U.S. Pat. No. 3,398,056, patented Aug. 20, 1968. The present invention deals with a still further improvement.

According to the Schindler, et al. patent, lysostaphin is produced by a new species of staphylococcus known as *Staphylococcus staphylolyticus*. A strain of this species is on deposit at the Northern Regional Research Laboratory in Peoria, Ill., as NRRL B-2628. Conventional fermentation techniques employing submerged culture are used for its production, and are also the subject of the Schindler, et al. patent. The Zygmunt et al. patent application Ser. No. 381,684, refers to a lysostaphin fermentation process which employs a medium having a relatively high concentration of enzymatically hydrolyzed casein as organic nitrogen source and glycerol as carbon source and provides higher yields of the antibiotic.

According to prior lysostaphin fermentation techniques, which are referred to in the foregoing disclosures, the fermentation medium is prepared by dissolving or suspending the ingredients in water, heat sterilizing, and then inoculating with a culture of *S. staphylolyticus*. Conventionally, the inoculum volume has been about 0.1% to 1% the volume of the fermentation batch. The object of sterilization, of course, is to forestall the growth of contaminating organisms which reduces the production of antibiotic and sometimes produces unwanted metabolites which may interfere with recovery of the antibiotic.

The lysostaphin fermentation, being a bacterial fermentation, differs in a number of respects from the more common antibiotic fermentations which employ fungi. For example, with lysostaphin production occurs during the log phase of growth rather than the stationary phase.

It has now been found that by use of a relatively large inoculum of a log phase culture of *S. staphylolyticus* of from 2.5% to 20% of the batch volume, that the time required for production of the maximal concentration of lysostaphin is reduced from one-half to one-quarter that normally required and furthermore, that growth of the organism is so luxuriant and rapid that it is not necessary to sterilize the fermentation broth. Furthermore, improved yields are obtained by use of the non-sterile medium. It is believed that this is related not to the lack of sterility, but rather to the fact that heating of the medium is avoided. Heat sterilization, undoubtedly, has a hydrolytic or denaturing effect on proteinaceous and other natural ingredients used in the broth. Evidently, the nutrients are presented to the microorganism in a more assimilable fashion if prior heating of the fermentation medium is avoided. This is presented as a theory and applicants do not intend to be bound by it. They are of the opinion that equally good fermentation yields could be obtained by using a broth sterilized by filtration in order to avoid heat sterilization, but this is not a practical suggestion due to the difficulty of filtering a crude fermentation broth through presently available bacterial filters.

In its simplest form the present invention involves inoculating a conventional lysostaphin fermentation medium or one such as is described in the Zygmunt et al. application, containing an assimilable carbon source and an assimilable organic nitrogen source with from 2.5% to 20% by volume of a log phase inoculum culture of *S. staphylolyticus*. This results in a substantially reduced time cycle for the production of maximal lysostaphin titers in the fermentation broth. Prior fermentations have employed much smaller proportions of inoculum and fermentation periods of the order of 12 to 18 hrs. According to the present invention, use of the large inoculum volume results in maximal antibiotic production in from 4 to 8 hrs.

When this discovery was applied to a medium in which heat treatment was avoided in its preparation, that is, a medium for which the conventional heat sterilization step was omitted, a still further increase in antibiotic titer was obtained. These findings are illustrated in Example 1 which compares the use of a 1% inoculum volume (the prior art) with the use of 10% inoculum volume (this invention) in fermentations employing both heat sterilized media (the prior art) and media which were not heat sterilized (this invention).

Example 2 which follows describes a series of fermentations in which inocula ranging from 2.5% to 20% by volume of the medium were employed, again using a medium in which all previous heat treatment was avoided and no other sterilization means were employed. It is evident from the results in which a 2.5% inoculum volume was used in comparison with the results with a 1% inoculum volume (Example 1), that 2.5% approaches the minimum operable volume for a shortened fermentation cycle according to the present invention. Possibly a somewhat lower inoculum volume than 2.5% could be employed and the benefits of the present invention realized. Nevertheless, the preferred inoculum volume is from 10% to 20% since substantially higher lysostaphin yields in the shorter time cycle are obtained.

Example 3 illustrates a preferred embodiment of the present invention in which repeated fermentation cycles are conducted by using an aliquot of one batch to inoculate the next. Again heat treatment of the medium as in heat sterilization is avoided. When reference to preparation of a fermentation medium without the application of heat is made in this disclosure, what is intended is that at no time after the ingredients are mixed with water is the batch exposed to a temperature in excess of 50° C. This permits gentle warming to effect dissolution or dispersion of the ingredients but precludes the use of heat sterilization. In this experiment after the initial fermentation was completed 80% by volume of the cultivated medium was removed for recovery of the antibiotic and 20% of the original volume was left in the fermenter to serve as inoculum for the succeeding cycle. The medium level was brought to its original value with fresh medium prepared in the same way as that employed in the first cycle and the cultivation was repeated as before. This was repeated four additional times for a total of five cycles. Satisfactory antibiotic titers were obtained in from 4 to 5 hrs. in each of the second, third, and fourth cycles but in the fifth cycle lower but still substantial titers were obtained. The maximum number of cycles that can be conducted in this fashion will vary with the specific equipment employed and other details, but generally speaking it is believed that an initial cycle and three subsequent cycles for a total of four batches is the maximum possible and it is preferred not to carry the cyclic process further since lower yields are obtained in subsequent cycles.

The following examples are given to further illustrate the invention but they are not to be considered as the sole embodiments thereof nor limitative of the scope of the invention.

EXAMPLE 1

Effect of inoculum size and heat sterilization of media

Eighty liters of fermentation medium having the following composition were prepared in four equal portions contained in separate 10 gal. stainless steel fermenters.

| | Percent by weight |
|---|---|
| Enzymatically hydrolyzed casein (NZ Amine E) | 4.8 |
| Soy peptone (Phytone) | 0.5 |
| Sodium Chloride | 0.5 |
| Dipotassium hydrogen phosphate | 0.25 |
| Dextrose | 0.125 |
| Glycerol | 1.0 |
| Water q.s. | 100 |

Two of the fermenters and contents were then heat sterilized at 118–122° C. for 45 min. No heat treatment was applied to the other two except for the mild warming to a temperature of about 50° C. to assist in dissolving the ingredients. One of the sterilized fermenters and one of the non-sterilized fermenters was then inoculated with 1% by volume of a logphase culture of *S. staphylolyticus*. The other two fermenters were inoculated with 10% by volume of the same culture. The fermenters were then aerated at the rate of 1 volume of air per minute, monitored for foaming, and the temperature controlled at 37° C. Periodic measurements of pH, dry cell weight, and lysostaphin concentration were made. The results obtained are arranged in the following table.

TABLE 1.—EFFECT OF INOCULUM SIZE AND PRIOR HEAT STERILIZATION OF MEDIUM

| Inoculum volume | Hours cultivated | pH | Dry cell weight (mg./ml.) | Lysostaphin titer (units/ml.) |
|---|---|---|---|---|
| Non-sterile medium | | | | |
| 1% | 10 | 7.4 | 29.7 | 3.7 |
| | 11 | 7.3 | 32.9 | 8.2 |
| | 12 | 7.4 | 31.5 | 11.5 |
| 10% | 2 | 7.15 | 4.4 | 1.3 |
| | 4 | 7.50 | 10.2 | 2.0 |
| | 6 | 7.30 | 18.1 | 6.8 |
| | 8 | 7.15 | 29.7 | 24.4 |
| | 10 | 7.70 | 32.9 | 24.5 |
| Sterile medium | | | | |
| 1% | 10 | 7.3 | 30.6 | 10.5 |
| | 11 | 7.2 | 33.9 | 18.6 |
| | 12 | 7.3 | 33.9 | 20.2 |
| 10% | 2 | 7.15 | 5.1 | 1.3 |
| | 4 | 7.50 | 13.4 | 5.7 |
| | 6 | 7.20 | 19.9 | 12.0 |
| | 8 | 6.85 | 26.4 | 13.2 |
| | 10 | 6.40 | 27.8 | 13.5 |

EXAMPLE 2

Comparison of various inocula ratios

Four 10 gal. stainless steel fermenters were prepared with a medium having the composition given in Example 1 each in an amount to provide a final batch volume of 20 l. The media were warmed to dissolve the ingredients but temperatures in excess of 50° C. were avoided, and the media were not heat sterilized. Each fermenter was then inoculated with a different sized portion of inoculum to provide a final volume in each of 20 l. with inocula varying between 2.5% and 20%. Periodic assays as before were made. The results are arranged in the following table:

TABLE 2.—EFFECT OF INOCULUM SIZE WITHOUT HEAT STERILIZATION

| Inoculum volume | Hours cultivated | pH | Dry cell weight (mg./ml.) | Lysostaphin titer (units/ml.) |
|---|---|---|---|---|
| 20% | 2 | 7.00 | 8.8 | 1.5 |
| | 4 | 7.25 | 12.1 | 4.5 |
| | 6 | 7.15 | 21.8 | 14.0 |
| | 7 | 7.00 | 28.8 | 22.0 |
| | 8 | 6.85 | 35.7 | 30.0 |
| | 9 | 7.20 | 38.0 | 38.0 |
| | 10 | 7.45 | 38.5 | 31.5 |
| 10% | 2 | 7.00 | 4.9 | 1.3 |
| | 4 | 7.20 | 14.8 | 4.3 |
| | 6 | 7.05 | 28.3 | 22.8 |
| | 7 | 6.85 | 34.8 | 27.7 |
| | 8 | 7.35 | 39.4 | 31.5 |
| | 9 | 7.60 | 39.4 | 32.0 |
| | 10 | 7.90 | 39.4 | 32.5 |
| 5% | 2 | 6.90 | 3.0 | 1.0 |
| | 4 | 7.30 | 6.7 | 1.5 |
| | 6 | 7.35 | 16.2 | 5.6 |
| | 8 | 7.10 | 27.4 | 17.0 |
| | 10 | 7.30 | 30.2 | 18.0 |
| 2.5% | 2 | 6.90 | 1.3 | <1.0 |
| | 4 | 7.15 | 4.8 | <1.0 |
| | 6 | 7.40 | 14.1 | 3.8 |
| | 8 | 7.15 | 29.7 | 17.8 |
| | 10 | 7.40 | 31.1 | 20.5 |

EXAMPLE 3

Cyclic fermentation procedure

One hundred and fifty liters of nutrient medium having the same composition as described in Example 1 was prepared. Thirty liters were set aside for the preparation of inocula. Twenty-four liters thereof were then charged to a 10 gal. stainless steel fermenter and inoculated with 6 l. of a log phase culture of *S. staphylolyticus*. Periodic assays for lysostaphin activity were made. When it appeared that the maximal antibiotic titer had been obtained, 24 l. of the mature culture medium was removed from the fermenter and set aside for recovery of the antibiotic. The same volume of fresh medium was then added to the vessel and cultivation was continued as before. This was continued through five cycles. The results are arranged in the following table.

TABLE 3.—CYCLIC FERMENTATION PROCESS

| Cycle No. | Hours cultivated | pH | Dry cell weight (mg./ml.) | Lysostaphin titer (units/ml.) |
|---|---|---|---|---|
| 1 | 2 | 7.05 | 5.3 | 2.7 |
| | 4 | 7.35 | 9.3 | 3.8 |
| | 6 | 7.30 | 17.9 | 11.1 |
| | 7.5 | 7.25 | 28.3 | 26.5 |
| 2 | 2 | 7.40 | 15.8 | 6.2 |
| | 4 | 7.50 | 29.2 | 22.0 |
| | 4.5 | 7.55 | | 29.6 |
| 3 | 2 | 7.40 | 15.8 | 6.9 |
| | 4 | 7.40 | 26.4 | 17.6 |
| | 4.5 | 7.50 | | 21.2 |
| 4 | 5 | 6.80 | 30.1 | 17.8 |
| 5 | 2 | 7.25 | 14.8 | 3.6 |
| | 4 | 6.75 | 23.7 | 10.0 |
| | 6 | 7.65 | 30.6 | 11.2 |
| | 8 | 8.25 | 33.4 | 11.2 |

In the foregoing examples the lysostaphin assays were conducted as is described in the Schindler, et al. patent, U.S. 3,278,378. This is a photometric procedure in which one unit of lysostaphin is defined as that amount of lysostaphin which will cause a 50% reduction in turbidity in 10 minutes of a suspension of *Staphylococcus aureus* FDA 209P cells of specified concentration relative to an identical control suspension which is not exposed to the test sample of lysostaphin.

A photometric procedure was also used to determine dry cell weights in the periodic assays reported above. A standard curve was employed from which the optical density of a diluted fermentation broth could be related to the dry cell mass contained therein.

What is claimed is:
1. In a fermentation process for producing lysostaphin by cultivation of a strain of *Staphylococcus staphylolyticus* on an aqueous nutrient medium containing assimilable sources of carbon and organic nitrogen, the improvement which comprises inoculating a volume of said nutrient medium which has at no time prior to employing it in said process been subjected to a temperature in excess of 50° C. with an amount of *S. staphylolyticus* inoculum culture having a volume of from 2.5% to 20% the total volume of inoculated medium.

2. The process of claim 1 wherein said inoculum culture has a volume of from 10% to 20% the volume of said medium after inoculation.

3. The process of claim 1 wherein said inoculum culture is an aliquot of a previous lysostaphin fermentation batch prior to harvest of the lysostaphin therefrom.

4. The cyclic fermentation process for the production of lysostaphin which comprises:
  (a) an initial cycle comprising inoculating an aqueous nutrient medium containing assimilable sources of carbon and organic nitrogen which has at no time prior to employing it in the process been subjected to a temperature in excess of 50° C. with from 2.5% to 20% by volume of inoculated medium of an *S. staphylolyticus* inoculum culture, cultivating said inoculated medium in a fermentation vessel at a temperature of 30° to 40° C. until substantial lysostaphin is produced, and;
  (b) removing from 80% to 97.5% by volume of resulting cultivated medium from said vessel, and;
  (c) a subsequent cycle comprised of charging to the residual cultivated medium in said vessel fresh medium of similar constitution cultivating as specified in (a), and removing cultivated medium as specified in (b) and;
  (d) repeating (c).

5. The process of claim 4 wherein from 80% to 90% of said medium is removed in step (b).

6. The process of claim 4 wherein said subsequent cycle is repeated to provide up to three of said subsequent cycles following a single initial cycle.

References Cited
UNITED STATES PATENTS 3,278,378   10/1966   Schindler et al. _____ 195—80X A. LOUIS MONACELL, Primary Examiner S. RAND, Assistant Examiner U.S. Cl. X.R.

195—100; 424—115